United States Patent [19]

Schumann

[11] 4,220,903
[45] Sep. 2, 1980

[54] SYSTEM FOR GUIDING A TOOL

[75] Inventor: Günter Schumann, Rödermark, Fed. Rep. of Germany

[73] Assignee: Messer Griesheim GmbH, Frankfurt am Main, Fed. Rep. of Germany

[21] Appl. No.: 844,316

[22] Filed: Oct. 21, 1977

[30] Foreign Application Priority Data

Nov. 17, 1976 [DE] Fed. Rep. of Germany ....... 2652364

[51] Int. Cl.² .......................................... G05B 19/36
[52] U.S. Cl. .................................. 318/577; 318/674; 250/202
[58] Field of Search ............... 318/576, 577, 571, 674; 219/124.32, 124.34, 137.71; 250/202

[56] References Cited

U.S. PATENT DOCUMENTS

| | | | |
|---|---|---|---|
| 3,612,818 | 10/1971 | Bechtle et al. | 219/137.71 |
| 3,860,862 | 1/1975 | Dell et al. | 318/577 |
| 3,995,154 | 11/1976 | Schlick et al. | 318/577 |

FOREIGN PATENT DOCUMENTS 2349073   4/1975   Fed. Rep. of Germany ........... 318/577

Primary Examiner—J. V. Truhe
Assistant Examiner—Eugene S. Indyk
Attorney, Agent, or Firm—Connolly and Hutz

[57] ABSTRACT

A system for guiding a tool according to a predetermined direction includes a detector head which photoelectrically scans a line of the pattern with the line varying in width at predetermined locations and with the output signals of the scanning photoreceptors being conductable to a switching device having an adjustable switching threshold so that when the scanning is in the area of the altered line width an auxiliary signal is formed in addition to the control signal for the coordinate motors.

2 Claims, 6 Drawing Figures

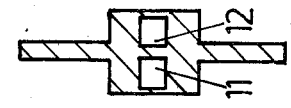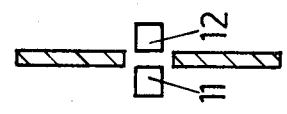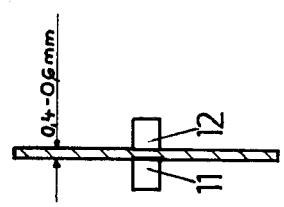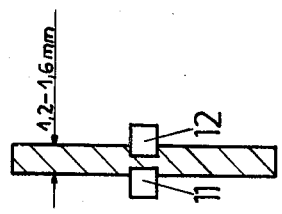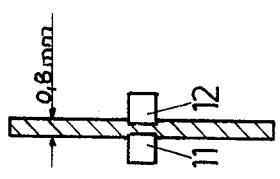

SYSTEM FOR GUIDING A TOOL

BACKGROUND OF THE INVENTION

The invention relates to a system for guiding a tool according to a predetermined direction as well as for producing auxiliary signals with a diagram pattern having a line to be scanned as well as a detector head for scanning the line photoelectrically, and which includes scanning photoreceptors, the output signal of which can be conducted to a leveling motor for adjusting the detector head and the tool associated with it in a direction tangent to the curve of the line whereby the leveling motor is connected with a component analyzer for controlling two coordinate motors.

The above general arrangement is known from processing machines, especially flame cutting machines, from German patents DT-AS 1,261,043 and DT-OS 2,349,073.

These known arrangements utilize for the production of auxiliary signals, either separate markings next to the line to be scanned with associated additional impulse light receptors (see German Patent DT-OS 2,349,073) or completely separate control lines with an additional photoelectric detector head (see German patent DT-AS 1,261,043).

These supplementary devices are disadvantageous because of cost and because they require a larger type of construction of the scanning arrangement. Aside from this, the setting up of separate control lines is likewise disadvantageous. It happens moreover, that with separate control lines, and separate detector heads a synchronous running between the two detector heads, as well as an exact corresponding of the patterns to be scanned, must be insured in order to, for example, make sure that upon utilization of the auxiliary signal for altering the rate of advance the auxiliary signal is produced when it is needed. This is particularly important when the rate of advance reduced with the auxiliary signal before curves, corners and the like to be scanned, should, however, be increased again after by-passing these locations.

SUMMARY OF THE INVENTION

The object of this invention is to achieve a device of the above type which does not have the above disadvantages and with which especially, a precise association of scanning and control signals is attainable.

In order to accomplish this object, the line to be scanned has at predetermined locations a different width in relation to the remaining course of the line and furthermore the output signal of the scanning photoreceptor is conductable to a switching device with an adjustable switching threshold so that upon scanning of the line in the area of the line width alteration an auxiliary signal is produced in addition to the control signal for the coordinate motors.

With the inventive system the drawbacks of the known devices are eliminated. An isolated scanning organ, the output signal of which is used as auxiliary signal is dispensed with in the use of the invention. The direction change of the detector head and the tool as well as the production of auxiliary signals is rather actuated by a single output signal of the photoelectric detector head.

This is particularly advantageous if the auxiliary signal is conducted to a device for altering the rate of advance of the detector head and tool, since an optimal coordination of both quantities which determining scanning quality (output signal or rate of advance) is constantly insured. At locations at which rate of advance should be reduced or increased as, for example, in the case of curved courses, before or after radii and the like a single increase or reduction of the line to be scanned is required according to the invention, preferably on a length which is to be followed with an altered rate of advance. The required signals are produced with the scanning photoreceptors in connection with the detector head as designed in the invention.

THE DRAWINGS

FIG. 1 is a schematic diagram of the inventive system; and

FIGS. 2a to 2e schematically illustrate various line widths and the signal magnitudes resulting thereof.

DETAILED DESCRIPTION

Figure 1:
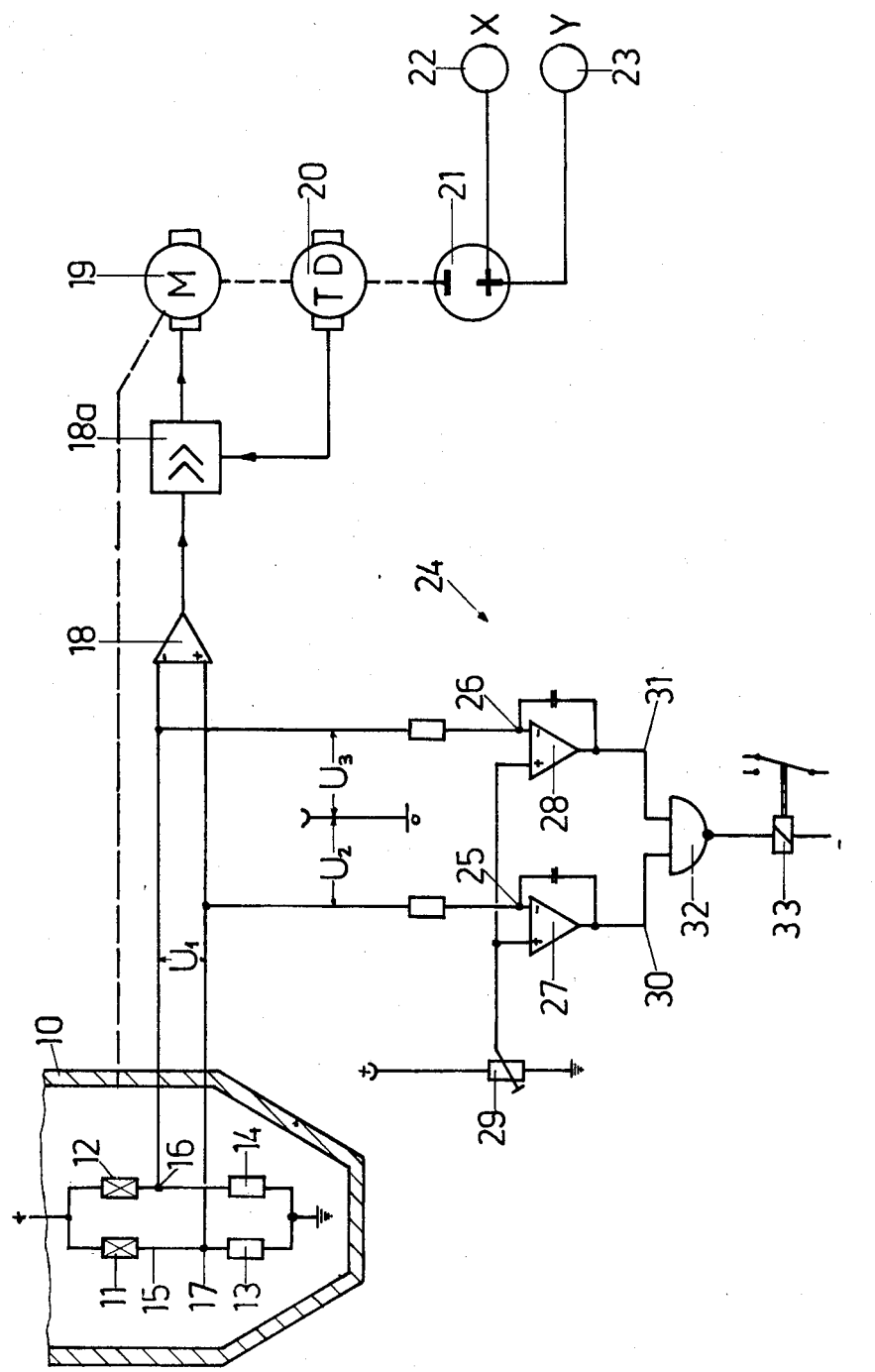

The system according to FIG. 1 includes a schematically illustrated detector head 10 in which scanning photoreceptors 11, 12 are mounted. These photoreceptors or photocells 11, 12 are preferably connected along with the resistors 13, 14 to a bridge circuit 15 whose outputs 16, 17 are connected to a difference amplifier 18. The amplifier 18 is electrically connected with a motor amplifier 18a and a redressing or leveling motor 19 which is mechanically connected with the detector head 10, a tacho-generator 20 as well as with a resolver 21. The motor 19 serves in well-known fashion to turn the detector head 10 and thereby the photoreceptors 11, 12 in a direction tangent to the line to be scanned. Furthermore, the generator 20 (for amplifier attenuation) and the resolver 21 are adjusted by means of the motor 19 so that at the output of the resolver there emerge the signals for the control of the coordinate motors 22 (x-direction) and 23 (y-direction) by means of which the tool and the detector head are moved according to the course of the line.

According to the invention, the output signals of the scanning photoreceptors 11, 12 are conducted to a switching device which is in its entirety marked 24. Each bridge output 16 and 17 respectively is preferably connected with the input 25, 26 of the threshold value switches 27, 28 of the switching device 24. The threshold value switches are designed as Schmitt-Triggers the switching threshold of which is adjustable with the rheostat 29. The outputs 30, 31 of the Schmitt-Triggers 28, 28 are preferably connected by means of a NAND gate 32 with the switching relay 33 of a device not illustrated in detail for altering the rate of advance.

The functioning of the inventive system is explained in greater detail in conjunction with FIGS. 2a to 2e.

When scanning a line with constant width (for example 0.8 mm—see FIG. 2a), the photoreceptors 11, 12 are equally obscured and the bridge output potential $U_1$ shows a value of zero. Depending upon the course of the line, the photoreceptors 11, 12 are variably lighted and there emerges a signal $U_1$ which controls the motor 19 via the amplifiers 18 and 18a. The motor 19 turns the resolver 21 of the coordinate drive and at the same time the detector head 10 until the photoreceptors are again equally illuminated.

If the line to be scanned having the same linear course is widened for example 1.2 to 1.6 mm—see FIG. 2b because at this location the rate of advance should be reduced then symmetry of the bridge 15 is further insured. The voltages $V_2$ and $V_3$ (see FIG. 1) become negative, however. The Schmitt-triggers 27 and 28 are so adjusted with the potentiometer 29 that they switch over at a precisely defined switching threshold. If both Schmitt triggers are switched on, a signal also results at the output of the NAND gate 32 and the relay 33 is activated, whereby the speed is switched over to a lower value. Upon a reduction of the line width to the original value, the voltages $V_2$ and $V_3$ are again reduced to their middle value, the Schmitt triggers disconnect and the relay 33 opens so that the original high speed is in operation again.

In corresponding manner auxiliary signals can be produced if the line is narrowed (0.4 to 0.6 mm—see FIG. 2c), in part, completely interrupted (see FIG. 2d) or so greatly widened that the photoreceptors are completely obscured (see FIG. 2e). The voltage magnitudes resulting therefrom, the resistance relationship as well as switching thresholds can be quantitatively inferred from FIGS. 2a to 2e.

FIGS. 2a to 2e show that with differential polarity and differently set threshold values, four auxiliary signals can be obtained from a simple photoresistor bridge whereby the preferred application areas in flame cutting for the types of signals according to FIGS. 2b to 2e are mentioned below:

FIGS. 2b, c and e: The flame cutting is switched in fast motion or slow motion. Cutting oxygen is switched from high preheating pressure to normal cutting pressure or the other way around. Initiation of marking processes. Switching the cutting performance using a laser in place of an autogenic burner as cutting tool. Switching corner deceleration on and/or off.

FIG. 2d upon leaving the line for a longer period of time, the machine is automatically stopped and the gas supply especially oxygen supply is switched off.

A further special application case results when with a widening of the line according to FIG. 2b the sensitivity of the amplifier 18a is reduced. The scanning then still follows the line but is, however, less sensitive. As a result lines which cross with less than 30° can also be scanned. The lines must be somewhat widened only in the crossing area.

According to the above examples of design, the Schmitt-triggers 27, 28 are connected with a NAND gate. But it is, of course, also possible to use the output signals of the Schmitt-triggers directly as auxiliary signals, individually or together.

What is claimed is:

1. In a process for guiding a tool in a predetermined direction as well as for producing auxiliary signals wherein a line is scanned photoelectrically with a detector head and the output signals are conducted, by a switching device to a leveling motor for adjusting the detector head and the tool associated with it in a direction tangent to the curve and whereby additionally the line to be scanned has at predetermined locations a width different from the remaining course of the line for the purpose of producing auxiliary signals; the improvement being wherein the line being scanned has a longitudinal axis and is of uniform width on each side of said axis and is of varying width at said predetermined locations, and scanning the line with two photoreceptors, one on each side of the line symmetrically disposed with respect to said longitudinal axis of the line.

2. In a process for guiding a tool in a predetermined direction as well as for producing auxiliary signals wherein a line is scanned photoelectrically with a detector head and the output signals are conducted, by a switching device to a leveling motor for adjusting the detector head and the tool associated with it in a direction tangent to the curve and whereby additionally the line to be scanned has at predetermined locations a width different from the remaining course of the line for the purpose of producing auxiliary signals; the improvement being wherein the line being scanned has a longitudinal axis and is of uniform width on each side of said axis and is of varying width at said predetermined locations, scanning the line with two photoreceptors, one on each side of the line symmetrically disposed with respect to said longitudinal axis of the line, conducting the auxiliary signals to a device for altering the rate of advance of the tool, mounting the photoreceptors in a bridge circuit, connecting each bridge output with the input of threshold value switches of the switching device, the threshold value switches being designed as Schmitt-triggers, and connecting the outputs of the threshold value switches with the device for altering the rate of advance by means of a NAND gate.

* * * * *